US008893559B2

(12) United States Patent
Drachmann (10) Patent No.: US 8,893,559 B2
(45) Date of Patent: Nov. 25, 2014

(54) ULTRASONIC CONSUMPTION METER WITH LOCKING MECHANISM

(71) Applicant: Jens Drachmann, Viby J (DK)

(72) Inventor: Jens Drachmann, Viby J (DK)

(73) Assignee: Miitors Aps (DK)

( * ) Notice: Subject to any disclaimer, the term of this patent is extended or adjusted under 35 U.S.C. 154(b) by 141 days.

(21) Appl. No.: 13/650,946

(22) Filed: Oct. 12, 2012

(65) Prior Publication Data

US 2013/0031988 A1 Feb. 7, 2013

Related U.S. Application Data

(63) Continuation of application No. PCT/DK2011/050035, filed on Feb. 8, 2011.

(30) Foreign Application Priority Data

Apr. 12, 2010 (DK) ................................ 2010 00306

(51) Int. Cl.
*G01F 1/20* (2006.01)
*G01F 15/14* (2006.01)
*G01F 1/66* (2006.01)
*G01F 15/18* (2006.01)

(52) U.S. Cl.
CPC ................ *G01F 1/662* (2013.01); *G01F 15/14* (2013.01); *G01F 15/18* (2013.01)
USPC ....................................................... 73/861.18

(58) Field of Classification Search
USPC .............. 73/861.18, 861.19–861.23
See application file for complete search history.

(56) References Cited

U.S. PATENT DOCUMENTS

| 4,302,066 | A | 11/1981 | Newman et al. |
| 4,871,323 | A | 10/1989 | Ohsumi |
| 5,160,175 | A | 11/1992 | Yang |
| 5,747,701 | A * | 5/1998 | Marsh et al. ............... 73/861.23 |
| 7,562,584 | B2 * | 7/2009 | Conquergood .................. 73/861 |
| 8,127,621 | B2 * | 3/2012 | Breen et al. ..................... 73/856 |
| 2006/0288798 | A1 | 12/2006 | Kroemer et al. |
| 2008/0236296 | A1 | 10/2008 | Sonnenberg et al. |

FOREIGN PATENT DOCUMENTS

| CN | 1821724 A | 8/2006 |
| DE | 19713526 A1 | 10/1998 |
| DE | 10051534 A1 | 4/2002 |
| DE | 102007011547 A1 | 9/2008 |
| DE | 102007019689 A1 | 10/2008 |
| DE | 202008014171 U1 | 3/2010 |
| EP | 0813041 A1 | 12/1997 |
| EP | 0890826 A1 | 1/1999 |

(Continued)

OTHER PUBLICATIONS

International Search Report & Written Opinion of the International Searching Authority Application No. PCT/DK2011/050035 Completed: Jul. 5, 2011; Mailing Date: Jul. 13, 2011 8 pages.

*Primary Examiner* — Jewel V Thompson
(74) *Attorney, Agent, or Firm* — St. Onge Steward Johnston & Reens LLC (57) ABSTRACT

An ultrasonic consumption meter includes an ultrasonic transducer for emitting and receiving ultrasonic waves, a flow channel, an electronic circuit for operating the meter, and a housing for the ultrasonic transducer and the electronic circuit. The housing is locked in position relative to the flow channel by a locking mechanism.

13 Claims, 7 Drawing Sheets

(56) References Cited

FOREIGN PATENT DOCUMENTS

| | | |
|---|---|---|
| EP | 0897101 A1 | 2/1999 |
| EP | 1136794 A2 | 9/2001 |
| EP | 1227303 A2 | 7/2002 |
| EP | 1435511 A2 | 7/2004 |
| EP | 1798528 A1 | 6/2007 |
| EP | 1983311 A2 | 10/2008 |
| EP | 2037231 A1 | 3/2009 |
| EP | 2083251 A1 | 7/2009 |
| EP | 2131162 A1 | 12/2009 |
| EP | 2236992 A1 | 10/2010 |
| WO | 9404890 A1 | 3/1994 |
| WO | 9420822 A1 | 9/1994 |
| WO | 2007020375 A1 | 2/2007 |
| WO | 2008053193 A1 | 5/2008 |
| WO | 2008129050 A1 | 10/2008 |
| WO | 2010009973 A1 | 1/2010 |
| WO | 2010112029 A1 | 10/2010 |

* cited by examiner

ULTRASONIC CONSUMPTION METER WITH LOCKING MECHANISM

FIELD OF THE INVENTION

This invention concerns an ultrasonic consumption meter for metering fluid substances such as water or gas, especially a meter exposed to condensing conditions or other harmful environments.

BACKGROUND OF THE INVENTION

Electronic consumption meters are delicate equipment that will suffer when placed in harmful environments, unless sensitive parts are well protected. The main cause of dysfunction is due to corrosion of the electronic circuit or the components.

As an example, an electronic meter for cold water is exposed to condensing water from the surrounding air, due to the temperature difference between the water in the meter and the potentially humid air. Other potentially harmful components in the environment could be aggressive gases or dust. An electronic water meter is also in risk of being dysfunctional, if water from the flow channel penetrates the barrier between the flow channel and the electronics.

Several known ways exist for protecting sensitive electronics in an ultrasonic consumption meter, which will be discussed below Hermetically sealed box for the electronics with sealed electrical connections between the transducers and the electronics. This is an effective solution, but unfortunately it is very costly, as sealed electrical connections are complex to manufacture.

Potted electronics with or without potted transducers (an example is shown in EP1983311). This I not a very effective solution for long-term exposure of moisture or water, as known materials for potting of electronics has a relatively high degree of vapor penetration. A water meter is typically used for many years, and in some cases it will even be submerged in water for very long periods. Thus the risk of damage to the meter is high in these conditions.

Multilayer protection of electronics and transducers (an example is shown in EP2083251). This can be effective in some applications, but it is complex and expensive.

Thus it is an objective to provide a cost-effective ultrasonic based consumption meter in which the sensitive parts are effectively protected against water and other harmful substances. Other parameters to take into consideration are the strength and durability of the meter, in particular the flow channel and the connections to connecting tubes such as treads.

SUMMARY OF THE INVENTION

It is the object of this invention to provide a low cost, durable, and long-lived ultrasonic consumption meter protected against moisture, water and other substances coming from the surroundings and from the inside of the flow channel.

The ultrasonic consumption meter comprises:
a flow channel for the media to be measured;
ultrasonic transducers for emitting and receiving ultrasound;
electronic circuit for operating the meter;
a housing for the transducers and electronic circuit; and;
a locking mechanism that locks the housing in position relative to the flow channel.

The flow channel directs the media to be measured between an inlet and an outlet. The flow channel has to be able to withstand the pressure of the media inside, and it has to be able to withstand forces applied to it from the outside. For a water meter, this is most preferably obtained if the flow channel is made of a metal such as brass or stainless steel, for a gas meter the strength requirements can be satisfied by polymers. In a beneficial embodiment, other features are placed in the flow channel between the inlet and the outlet, such as reflectors for redirecting ultrasonic waves, flow disturbance correctors, and dimension changes for optimization of the flow directions and velocities inside the flow channel. Such features can be made of several different materials, such as polymers, glass filled polymers or metal.

The flow channel directs the media to be measured between an inlet and an outlet. The flow channel has to be able to withstand the pressure of the media inside, and it has to be able to withstand forces applied to it from the outside. For a water meter, this is most preferably obtained if the flow channel is made of a metal such as brass or stainless steel, for a gas meter the strength requirements can be satisfied by polymers. In a beneficial embodiment, other features are placed in the flow channel between the inlet and the outlet, such as reflectors for redirecting ultrasonic waves, flow disturbance correctors, and dimension changes for optimization of the flow directions and velocities inside the flow channel. Such features can be made of several different materials, such as polymers, glass filled polymers or metal.

The housing comprises at least two parts: a cup and a lid, with a hermetical seal between the two.

The cup is most preferably made of a low-diffusion, high strength polymeric material, such as High Density-polymers like PPS (Polyphenylene Sulphide) or PSU (Polyether Sulfone). Although these materials are not completely impenetrable for water, the penetration rate is very small, and many years of safe operation can be expected. Further increase in material strength is achieved by a mixing the polymer with fibers, such as glass fibers or mineral fibers. 40% glass fibers are preferred, as this makes a comfortable compromise between produceability, cost, and strength. As an alternative the cup can be manufactured out of metal, but this is considered less optimal, due to cost and design constraints.

Some optional features as mentioned in the description of the flow channel can be mounted on the cup, such as reflectors or flow correctors.

The lid is also most preferably made of a low-diffusion material such as a High Density-polymer. Unfortunately most of these are opaque or light-tight, so if a display is a part of the electronic circuit, it cannot be seen. Thus in such cases, glass or special polymers like COC (CYCLIC OLEFIN COPOLYMER) are favorably used for the lid. These materials exhibits transparency as well as a low diffusion rate of water vapor.

The hermetical seal between the lid and the cup can be one or more o-rings, a fluid rubber material, a welding seam or glue.

The lid is preferably held in place by a locking ring. The locking holds the cup and the lid together, and it can be secured by a legal seal, so that opening of the meter leaves visible traces.

Depending on the materials used and the effectiveness of the seal, a small amount of water vapor might penetrate the housing during the years of use. In this case further protection of the electronics from corrosion is obtained by placing a desiccant inside the housing. Examples of desiccants are silica gel, calcium sulfate, calcium chloride, some types of clay, and molecular sieves.

Especially advantageous is a housing impenetrated by electrical wires, as this lowers the risk of imperfections and leakage of water vapor and other hazardous substances into the housing.

The ultrasonic transducers are typically made of a piezo electrical material, typically of the Lead Zirconate Titanate (PZT) type. The transducers emit ultrasonic waves when a voltage differential is asserted to them, and they produce an electrical charge when an ultrasonic pressure wave is asserted to them. At certain frequencies, depending on the material parameters and the mechanical shape of the transducers, the transformation between the energy forms voltage, ultrasonic pressure waves, and electrical charge is most efficient. Such frequencies are called resonance frequencies. When the piezo material is directly acoustically coupled to other materials, this will affect the resonance frequencies and the level of transformation between the different forms of energy. An advantageous position of the piezo electric material is inside the housing, so that electrical connections penetrating the housing are avoided. This means, that the piezo electric material is pressed against the housing at appropriate places, with an acoustical coupling material in between. The acoustical coupling material assures that acoustical energy is transported with little energy loss between the piezo electric material and the housing, and it can preferably be of the following types: silicon oil, silicon gel, glycol, glue, conducting glue, or oil. Appropriate force on the piezo electric material towards the housing is most preferably achieved by springs on the backside of the piezo electric material. Especially advantageous are metallic springs, with the additional function that they can be used for electrical connections between the piezo electric material and the electronic circuit.

The electronic circuit controls the emission and reception of ultrasonic signals, and converts the received signals to one or more usable values, depending on the flow in the flow channel. The values are shown on a display inside the housing, or it is transmitted to the outside of the housing by radio waves, magnetic pulses, electrostatic pulses, light pulses, or wires, or a combination of the six alternatives. Wireless transmission of values is preferred, so that electrical connections penetrating the housing can be avoided.

The electronic circuit is connected to a power supply, most preferably a battery placed inside the housing. Other solutions for the power supply are: a wired connection to an energy source outside the housing or an energy harvesting circuit placed inside the housing collecting mechanical, electromagnetic, magnetic, electrostatic, thermal, or radioactive energy from the environment and converting it to electrical energy. A harvesting circuit needs a power supply back-up system such as a rechargeable battery or a high capacity capacitor for periods without external energy sources.

The locking mechanism ensures that the housing does not move relative to the flow channel. This is important, as the piezo electric material is placed inside the housing, and thus movements between the housing and the flow channel potentially affects the measurement results.

Further, preferably the flow channel will have holes, so that ultrasound transmitted from the piezo electric material through the housing will enter easily into the media streaming in the flow channel. These holes must be sealed, so that the media will not flow outside the flow channel, so the sealing is placed between the housing and the flow channel. The locking mechanism ensures that this sealing has to absorb only small or no movements between the flow channel and the housing.

A simple locking mechanism could be screws holding the two pieces together, but a preferred solution is a locking mechanism with no screws, as this is the optimal solution for automated production. Such a locking mechanism is proposed in this invention.

On the outside of the flow channel protrusions are made so that one or more fixing pins locks the housing in position, when the fixing pins are inserted into matching holes in the cup, after this is correctly placed in position at the flow channel.

Alternatively, the holes in the cup can be incomplete, such as not completely surrounding the pins when they are inserted.

In the simplest form, the protrusions on the flow channel are positioned above protrusions on the cup with an offset. This allows the protrusions on the two parts to pass each other in the assembly process, so that the cup can be mounted on the flow channel without any protrusions from the two parts touching each other. The locking process is thus operating like a zipper, the housing and the flow channel being zipped together by the one or more locking pins.

It is preferred that the one or more locking pins are moved into position in a movement parallel to the flow channel as this allows a larger distribution area for the forces that arises on the housing, when the pressure in the flow channel rises.

An invisible locking mechanism can be obtained by hiding all the locking protrusions of one of the parts, by protrusions on the other part.

The one or more locking pins may advantageously be secured by a sealing, so that disassembly of the meter leaves a visible trace.

DETAILED DESCRIPTION OF THE INVENTION

Figure 1:
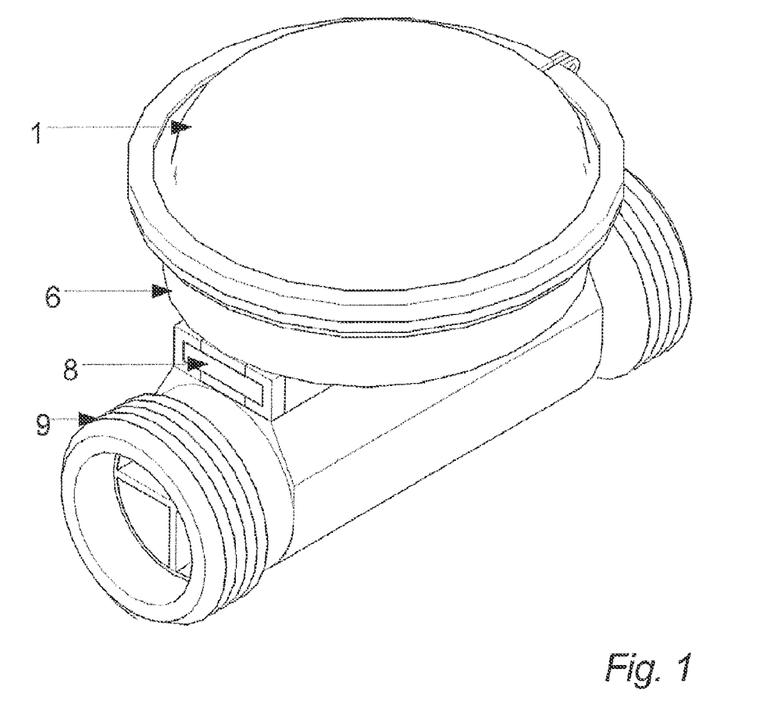
FIG. 1 illustrates a drawing of a complete consumption meter
Figure 2:
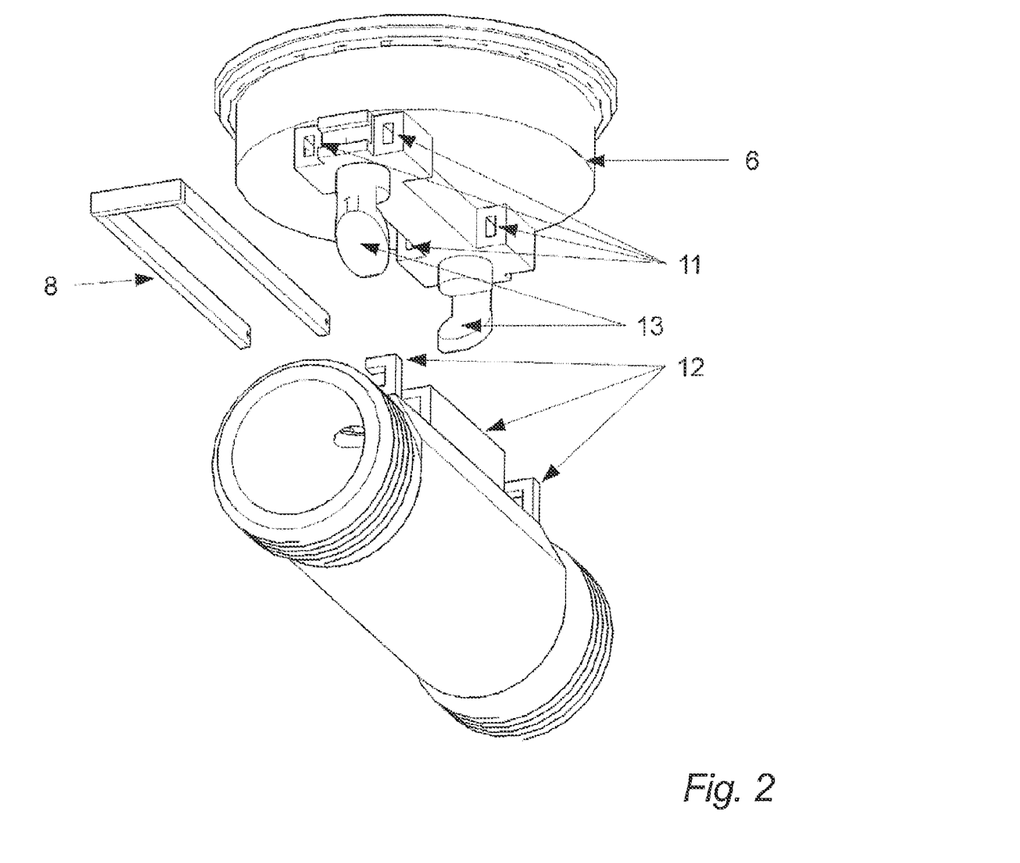
FIG. 2 illustrates an exploded view of the three parts involved in the locking mechanism
Figure 3:
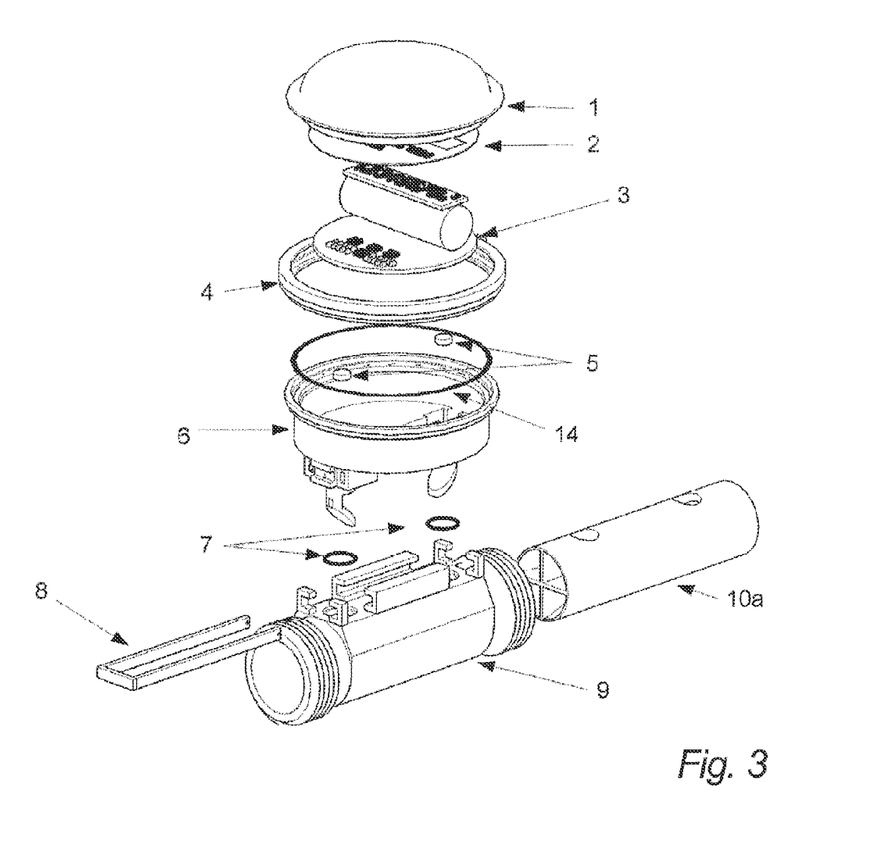
FIG. 3 illustrates an exploded view of the complete meter
Figure 4:
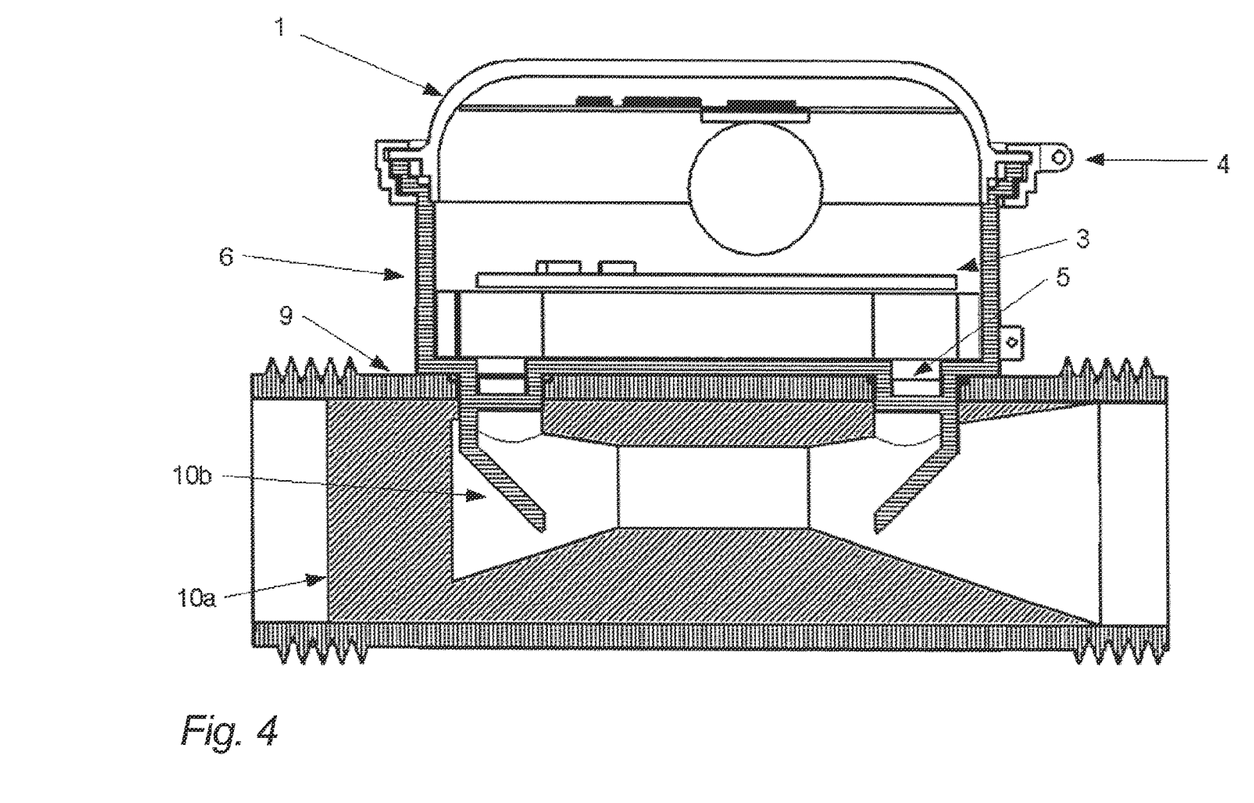
FIG. 4 illustrates a sliced view of the complete meter. The insert 10*a* is fixed in its position, by the feature 10*b* on the cup
Figure 5A:
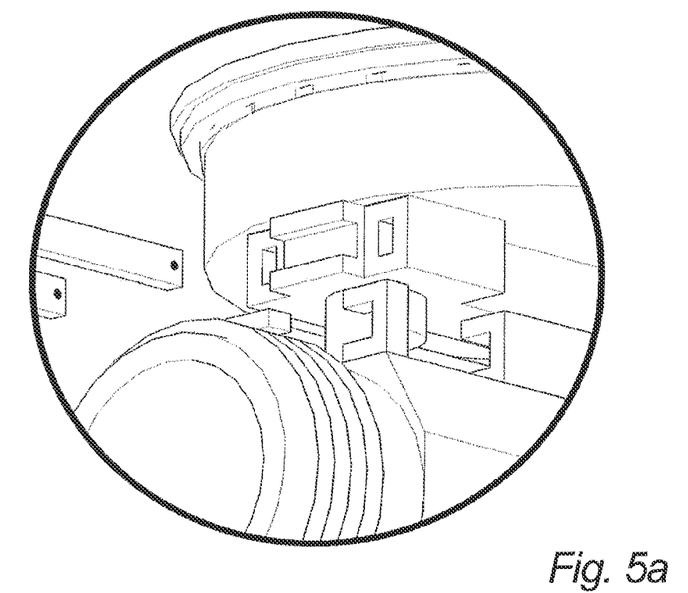
FIG. 5*a* and FIG. 5*b* illustrate a detail of the locking mechanism, with full holes in the cup as part of the locking mechanism
Figure 5B:
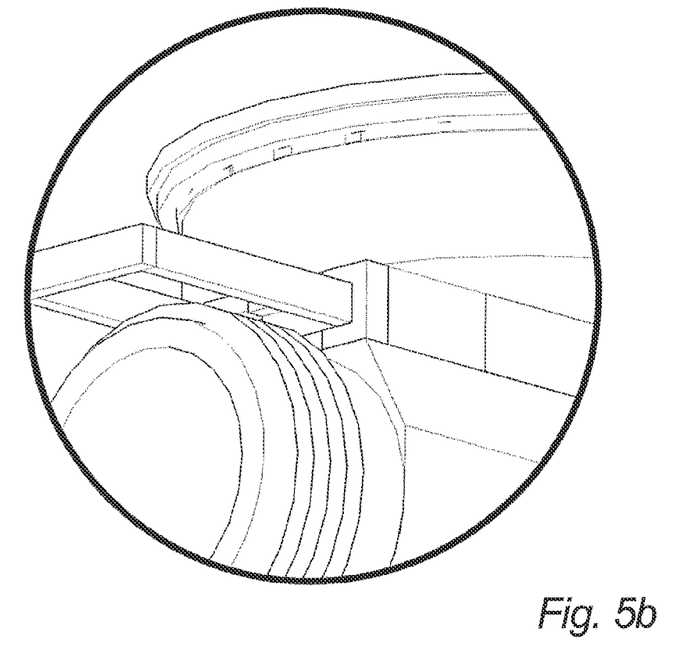
Figure 5C:
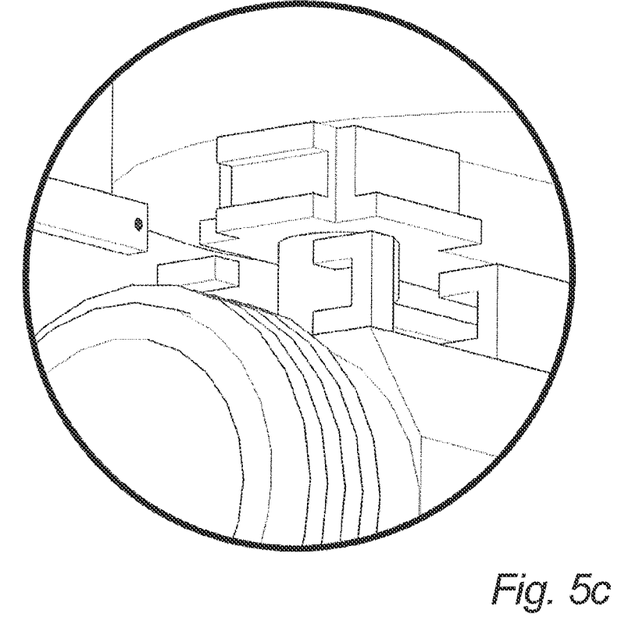
FIG. 5*c* and FIG. 5*d* illustrate a detail of the locking mechanism, with simple protrusions on the cup as part of the locking mechanism
Figure 5D:
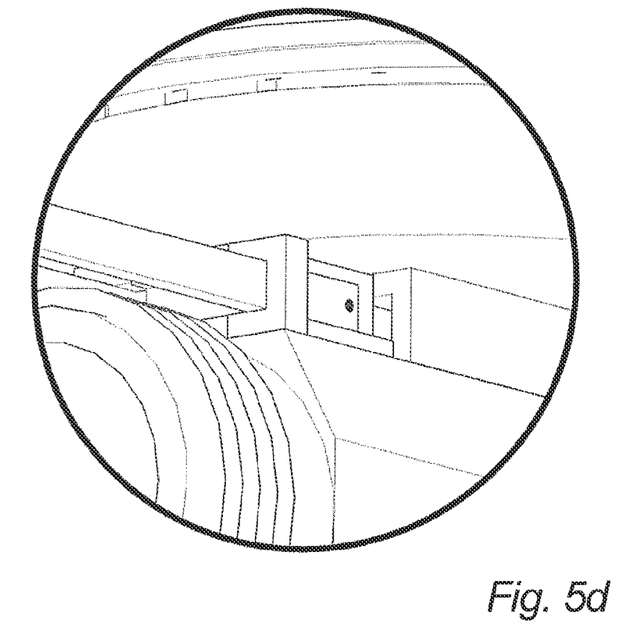
Figure 6:
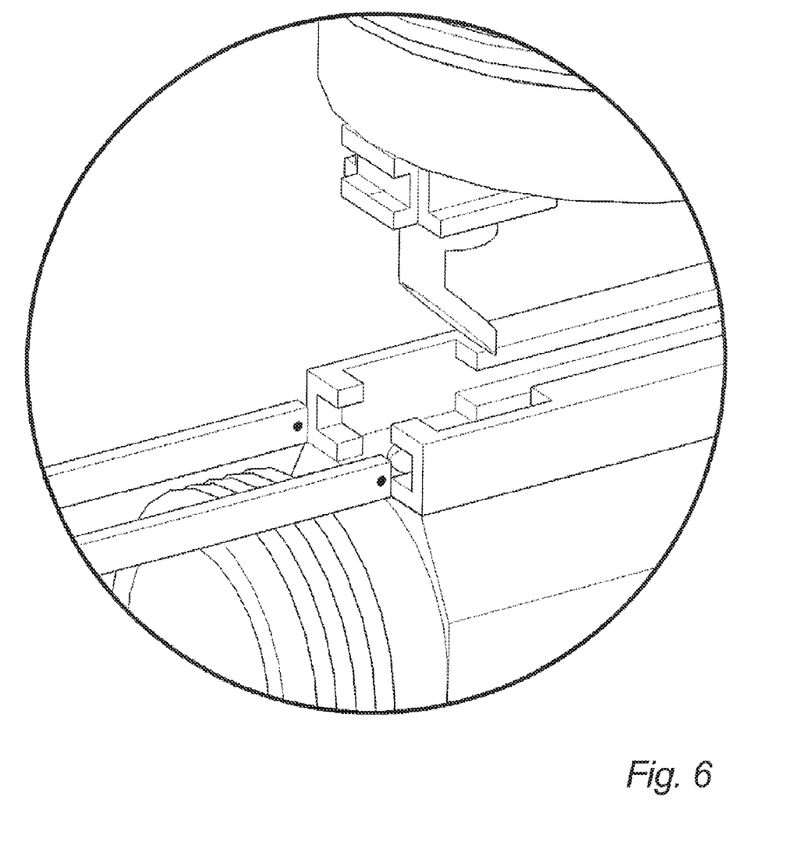
FIG. 6 illustrates a detail of an invisible locking mechanism

Referring now to the drawings, the elements are numbered as follows:

(1) A lid. If a display or a front plate is present inside the housing, a transparent lid is advantageous. The lid is a part of the housing.

(2) Front plate with information about the consumption meter, visible through the lid. The information can be of the following kind, but is not limited to: meter number, approval number, meter type, vendor name, utility name, meter size, or machine readable information such as barcodes or patterns.

(3) Electronic circuit, comprising a Printed Circuit Board, electronic components, a power supply unit, such as a battery, and a display. In an advantageous embodiment, the interfaces for communication, such as optical communication, radio communication, or wired communication are a part of the electronic circuit. In addition to values derived from measurements, the display can optionally show information received via the communication interfaces. In an especially advantageous embodiment, a pressure sensitive device is included in the electronic circuit, so that the pressure in the hermetically sealed housing is supervised.

(4) Locking ring that holds the lid and the cup together. The ring is divided at one place on the perimeter, so that it can be fixed around the lid and the cup. In a consumption meter used for billing it is advantageous to secure the locking ring with a seal, so that if is impossible to open the lid without breaking the seal or the locking ring. An advantageous means for sealing is a wire drawn through two holes on the locking ring, one hole on each side of the division of the ring. Alternatively a piece of marked adhesive tape that breaks when it is removed can be used as a seal. A polymeric material is most advantageous for the locking ring the material can be with or without reinforcing fibers.

(5) Piezo electric material that emits and receives ultrasound. A suitable material is PZT sintered and machined to size and then polarized. In Doppler effect based consumption meters a single piece of piezo electric material suffices in most cases, for consumption meters based on the transit time principle, at least two pieces of piezo electric material are needed.

(6) A cup, which is a part of the housing that holds the electronic circuit and the piezo electric material. In some embodiments it is beneficial to design the cup large enough for a desiccant to be placed inside the housing. The desiccant can be placed in a separate compartment with a separate lid inside the cup, or it can be handled in a small bag which is put inside the cup. The cup is attached to the flow channel with one or more locking pins. The cup is most preferably made in a single piece of fiber reinforced polymer. As the housing is hermetically sealed, it can be to difficult press the lid into the cup in an environment with normal air-pressure, as the air trapped inside the housing will apply an increased pressure on the lid from the inside when the lid is closing. Thus it is beneficial to locally lower the pressure of the air surrounding the housing during the assembly process, such as in an airtight assembly box. Alternatively a small hole on the side of the cup will allow air to be pressed out during the assembly of the lid, and then the hole can be plugged at a later stage. The plug can be of the same material as the cup or another material, and it can be glued, welded or pressed to the cup, alternatively the plug is sealed with an o-ring or similar. For practical reasons, the diameter of the cup is typically less than 15 cm and larger than 3 cm. The height of the cup is typically less than 6 cm and larger than 1 cm.

(7) Sealing means between the flow channel and the housing. In the preferred embodiment this sealing means consists of one or more o-rings. The o-rings prevent the media to be measured by the meter to escape from the flow channel. The o-ring has preferably a material diameter of 0.5 to 4 mm, and the hole typically has a diameter of 5 to 15 mm. The o-rings are made of rubber-like or thermoplastic material.

(8) One or more locking pins that fasten the housing to the flow channel. The locking pin is inserted parallel or perpendicular to the flow channel between protrusions in the cup and the flow channel. This way the two parts are locked together. After insertion, the locking pin can be secured by sealing means that prevents extraction of the pin without leaving a visible trace on the seal or the housing or the flow channel. An advantageous sealing means is a wire drawn through a hole in the locking pin. The seal securing the locking pin can be combined with the seals securing the locking ring.

(9) Flow channel directing the media to be metered from an inlet to an outlet. In a preferred embodiment, the media is water, and the flow channel is made of an extruded piece of brass that is cut to a suitable length and then machined for the desired shape. On one side of the flow channel, protrusions are cut out of the brass with a milling cutter, so that shapes suitable for a locking mechanism are made. On the same side of the flow channel as the protrusions, one or more circular holes are made in the flow channel. The holes have an extended diameter on the outer side for o-rings. These one or more holes fit with circular shapes on the cup, so that a water tight sealing can be designed with the one or more o-rings between the flow channel and the cup. In another preferred embodiment, the media is gas, and the flow channel is made of a polymeric material. In this case the holes and the protrusions are created at the time of casting of the flow channel.

(10) (13) Features inside the flow channel. These are preferably made by an insert made of polymeric material reinforced with glass fibers. On the insert, metallic objects are optionally fixed for reflexion of the ultrasound or for redirection of the flow of the media to be metered. The shape of the polymeric insert serves as reflectors or redirectors in an especially advantageous embodiment. In some embodiments, some of the features such as reflectors are fixed to the cup before it is mounted on the flow channel. In an especially advantageous embodiment, an insert put into place from either the inlet or the outlet is fixed into place by the placement of the cup on the flow channel. This is achieved by having features on the cup going into indents or holes on the insert.

(11) Protrusions on the cup serving as a part of the locking mechanism. In an embodiment that needs maximum strength, it is an advantage to design these protrusions as holes. In an embodiment with less constraints on strength, it is an advantage to design the protrusions as incomplete holes, such as simple protrusions.

(12) Protrusions on the flow channel, serving as part of the locking mechanism. In some embodiments it is an advantage to protect the locking mechanism from tampering, and a hidden locking mechanism is preferred. This is designed by extending the protrusion on the flow channel or the cup over the locking mechanism, so that it cannot be seen or manipulated from the outside.

(13) Features in the flow channel fixed to the cup.

(14) Sealing means between the cup and the lid. In the preferred embodiment, this sealing means consists of one or more o-rings. Redundant o-rings will increase the robustness of the meter in the case of imperfections on one of the parts involved in the sealing that is the lid, the cup or an o-ring. The one or more o-rings is made of a rubber-like or thermoplastic material.

Although the present invention has been described in connection with preferred and advantageous embodiments, it is not intended to be limited to the specified form and applications. Rather, the scope of the present invention is limited only by the accompanying claims.

In this section, certain specific details of the disclosed embodiments are elaborated for purposes of explanation rather than limitation, so as to provide a clear and thorough understanding of the present invention. However, it should be understood readily by those skilled in this art that the present invention may be applied in other embodiments which do not conform exactly to the details shown, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

What is claimed is:

1. An ultrasonic consumption meter comprising:
a flow channel for the media to be measured;

at least one ultrasonic transducer for emitting and receiving ultrasound;
an electronic circuit for operating the meter; and,
a housing for the transducers and the electronic circuit; characterized by
    a locking mechanism that locks the housing in position relative to the flow channel; and
    wherein the housing consists of a cup, a lid and a hermetical seal.

2. The ultrasonic consumption meter according to claim 1, wherein the flow channel has at least one hole for the housing to contact the media.

3. The ultrasonic consumption meter according to claim 1, wherein the locking mechanism comprises at least one protrusion on the housing, at least one protrusion on the flow channel, and at least one locking pin.

4. The ultrasonic consumption meter according to claim 3, wherein the locking mechanism is configured such that the at least one locking pin can be inserted and extracted by a movement parallel to the length of the flow channel.

5. The ultrasonic consumption meter according to claim 3, wherein the locking mechanism is configured such that the at least one locking pin can be inserted and extracted by a movement perpendicular to the length of the flow channel.

6. The ultrasonic consumption meter according to claim 1, wherein the consumption meter is a water meter.

7. The ultrasonic consumption meter according to claim 1, wherein the consumption meter is a gas meter.

8. The ultrasonic consumption meter according to claim 3, wherein the at least one locking pin is secured by a seal.

9. The ultrasonic consumption meter according to claim 1, wherein the electronic circuit includes a pressure sensitive device.

10. The ultrasonic consumption meter according to claim 1, wherein an insert in the flow channel is fixed in its position by one or more features on the cup.

11. The ultrasonic consumption meter according to claim 1, wherein the housing is not penetrated by electrical wires.

12. An ultrasonic consumption meter comprising:
a flow channel for the media to be measured;
at least one ultrasonic transducer for emitting and receiving ultrasound;
an electronic circuit for operating the meter; and,
a housing for the transducers and the electronic circuit; characterized by
    a locking mechanism that locks the housing in position relative to the flow channel;
    wherein the locking mechanism comprises at least one protrusion on the housing, at least one protrusion on the flow channel, and at least one locking pin; and
    wherein the locking mechanism is configured such that the at least one locking pin can be inserted and extracted by a movement parallel to the length of the flow channel.

13. An ultrasonic consumption meter comprising:
a flow channel for the media to be measured;
at least one ultrasonic transducer for emitting and receiving ultrasound;
an electronic circuit for operating the meter; and,
a housing for the transducers and the electronic circuit; characterized by
    a locking mechanism that locks the housing in position relative to the flow channel; and
    wherein the housing is not penetrated by electrical wires.

\* \* \* \* \*